United States Patent [19]

Kennedy

[11] Patent Number: 4,958,709
[45] Date of Patent: Sep. 25, 1990

[54] INTEGRALLY FORMED WIPER AND ORIFICE FOR A PUMP PLATE OF A VISCOUS FLUID CLUTCH

[75] Inventor: Lawrence C. Kennedy, Kettering, Ohio

[73] Assignee: General Motors Corporation, Detroit, Mich.

[21] Appl. No.: 398,590

[22] Filed: Aug. 25, 1989

[51] Int. Cl.[5] ............................................. F16D 35/02
[52] U.S. Cl. ................................................. 192/58 B
[58] Field of Search ........................... 192/58 B, 82 T

[56] References Cited

U.S. PATENT DOCUMENTS

| | | | |
|---|---|---|---|
| 3,055,473 | 9/1962 | Oldberg et al. | 192/82 T X |
| 3,174,600 | 3/1965 | Oldberg | 192/82 T X |
| 3,179,221 | 4/1965 | Weir | 192/58 B |
| 4,051,936 | 10/1977 | Crisenbery et al. | 192/58 B |

FOREIGN PATENT DOCUMENTS 2099960 12/1982 United Kingdom ............. 192/82 T

Primary Examiner—Richard Lorence
Attorney, Agent, or Firm—A. Michael Tucker

[57] ABSTRACT

A fan clutch assembly for a vehicle includes a rotatable pump plate for separating a collecting chamber and a pumping chamber from a reservoir. The pump plate includes at least one wiper integrally formed with the pump plate and projecting from a pump plate surface into the pumping chamber. An aperture oriented in the direction of oncoming fluid in the pumping chamber is provided through the wiper to form an orifice for fluid to pass from the pumping chamber to the reservoir. A damming surface oriented toward the orifice is provided on the wiper for creating a pressure rise and enhancing the pump-out of fluid from the pumping chamber.

1 Claim, 2 Drawing Sheets

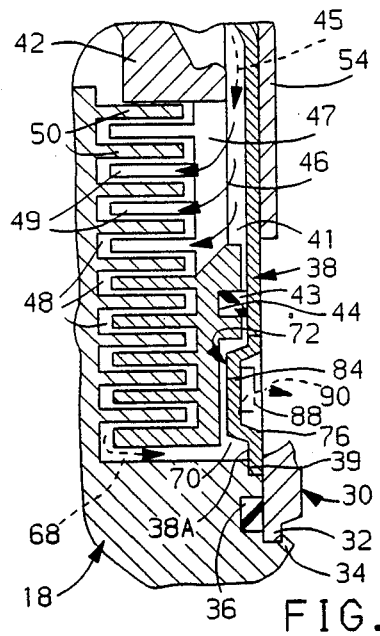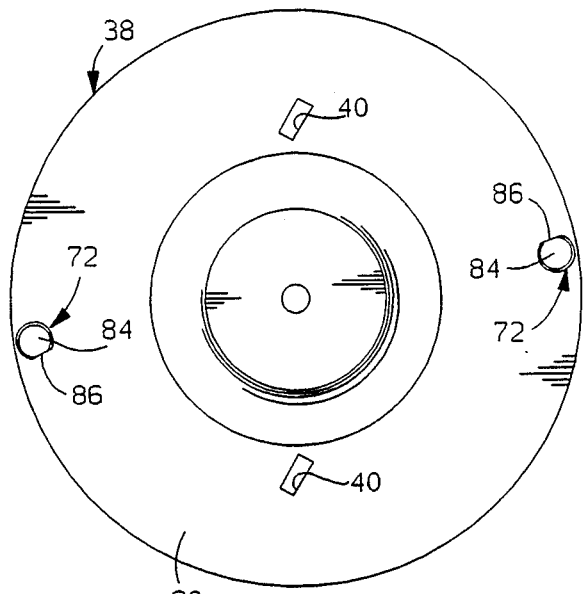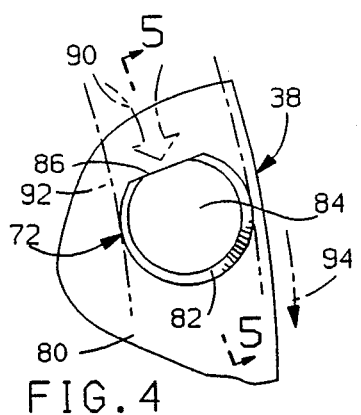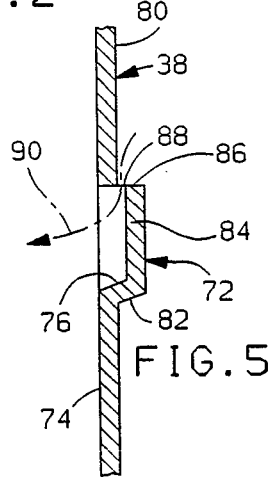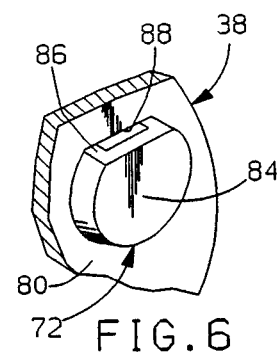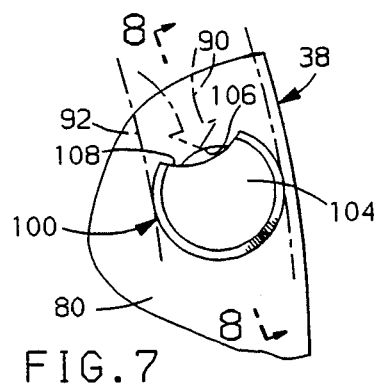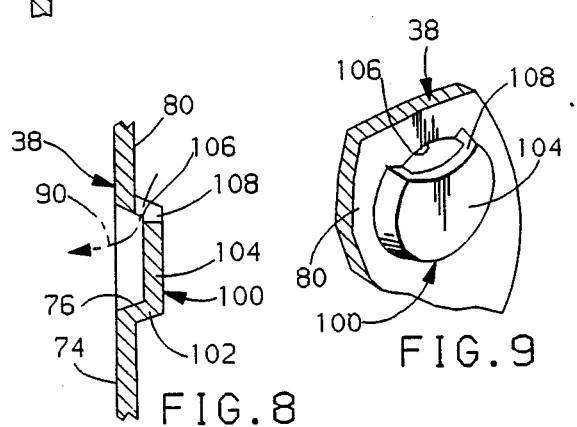

INTEGRALLY FORMED WIPER AND ORIFICE FOR A PUMP PLATE OF A VISCOUS FLUID CLUTCH

BACKGROUND OF THE INVENTION

1. Field of the Invention

The present invention relates generally to a viscous fluid coupling device. In particular, the present invention is concerned with an integrally formed wiper and orifice for a pump plate of a viscous fluid fan clutch.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch assembly includes a clutch plate having lands and grooves mated to the body having complementary lands and grooves. A pump plate separates a pair of internally-contained chambers, a collecting chamber and a pumping chamber, from a reservoir. Gates in the pump plate permit selective flow of a viscous fluid from the reservoir to the collecting chamber and into a shear zone between the lands and grooves of the body and clutch plate. Fluid sheared between the lands and grooves transfers input torque from the clutch plate to drive the body and the attached fan.

When cooling is not required, gates in the pump plate are closed and the fluid in the shear zone is pumped into the pumping chamber. Orifices in the pump plate permit passage of the fluid from the pumping chamber into the reservoir. The removal of a majority of the fluid from the shear zone substantially reduces the shear between the clutch plate and the body, thereby substantially reducing the rotation of the fan.

It is well-known to provide wiper elements on a surface of the pump plate in communication with the pumping chamber. A wiper, which can be formed as a thin, flat element, is secured to the pump plate (usually by welding) adjacent each pump plate orifice. In other embodiments, a wiper may be integrally formed with the pump plate by stamping a cylindrical projection in a pump plate adjacent each pump plate orifice. As the wiper encounters fluid in the pumping chamber, an increase in fluid pressure in the pumping chamber occurs as the wiper creates a fluid dam. The increase in fluid pressure results in increased fluid flow through the pump plate orifices.

To further enhance the pumping ability of a wiper, it is well-known to provide a "scoop" surface on a wiper. A scoop surface is a curved surface of the wiper oriented toward a pump plate orifice. A curved surface may include an inlet or "bay" portion which receives oncoming fluid in the pumping chamber and creates a fluid dam.

A welded wiper is generally more costly than a wiper formed through a stamping operation because of the additional assembly time. However, scoop surfaces provided in welded wipers provide increased pump-out capabilities over conventional stamped wipers which do not include scoop surfaces. With both welded and stamped wipers, an orifice must be provided in the pump plate adjacent each wiper.

The art continues to seek improvements. It is desirable to provide wipers on a pump plate to provide quick pump-out of fluid in a pumping chamber. Furthermore, it is desirable to provide a low-cost stamped wiper having a fluid damming surface which is economical to manufacture and compatible with conventional pump plates.

SUMMARY OF THE INVENTION

The present invention includes a viscous fluid drive device particularly adaptable for a fan clutch assembly of a vehicle. The present fan clutch assembly utilizes a pump plate having an integrally formed wiper and orifice. An opening is provided through a stamped wiper to form an orifice, thereby eliminating the need for conventional pump plate orifices. Additionally, a fluid damming surface is provided to increase the pump-out of fluid from the pumping chamber. The present wiper is economical to manufacture and compatible with conventional pump plates.

The present invention includes a fan clutch assembly for a vehicle. The clutch assembly includes a rotatable pump plate for separating a collecting chamber and a pumping chamber from a reservoir. The pump plate includes at least one wiper integrally formed with the pump plate and projecting from a pump plate surface into the pumping chamber. An aperture oriented in the direction of oncoming fluid in the pumping chamber is provided through the wiper to form an orifice for fluid to pass from the pumping chamber to the reservoir. A damming surface oriented toward the orifice is provided on the wiper for creating a pressure rise and enhancing the pump-out of fluid from the pumping chamber.

BRIEF DESCRIPTION OF THE DRAWINGS

FIG. 2 is an enlarged view of a portion of the clutch assembly of FIG. 1 wherein the pump plate has been rotated to illustrate fluid flow from a pumping chamber through a pump plate orifice.

FIG. 3 is a top plan view of the present pump plate removed from the clutch assembly of FIG. 1 and illustrating a pair of integrally formed wipers and orifices.

FIG. 4 is an enlarged top plan view of one of the wipers of FIG. 3 illustrating a planar damming surface.

FIG. 5 is a sectional view taken along line 5—5 of FIG. 4.

FIG. 6 is a perspective view of the wiper of FIGS. 4 and 5 illustrating a fluid inlet.

FIG. 7 is an enlarged top plan view of a second embodiment of an integrally formed wiper and orifice provided on a pump plate illustrating an arcuate damming surface.

FIG. 8 is a sectional view taken along line 8—8 of FIG. 7.

FIG. 9 is a perspective view of the wiper of FIGS. 7 and 8 illustrating a fluid inlet.

DETAILED DESCRIPTION OF THE PREFERRED EMBODIMENTS

Figure 1:
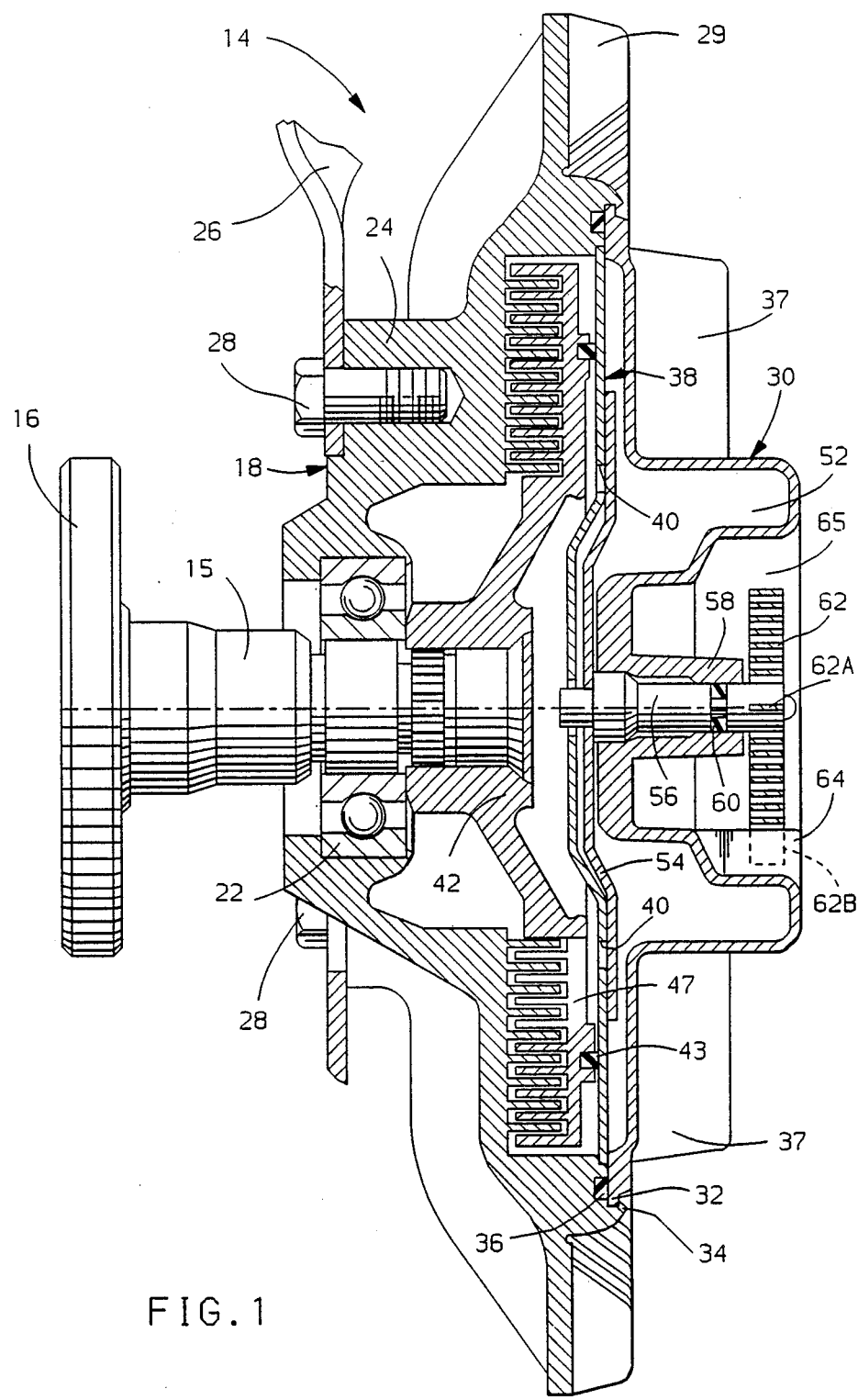
FIG. 1 is a sectional view of a viscous fluid fan clutch and blade assembly incorporating a pump plate of the present invention.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 28. A plurality of fins 29 are provided on the outer surface of the main body 18 to dissipate heat transferred from a viscous fluid housed by the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g. a formed-in-place gasket, is interposed between the edge 32 and the front face of the main body 18 to prevent leakage of the fluid from the interior of assembly 14. A plurality of fins 37 are provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (see FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is mounted (preferably splined or knurled) on shaft 15 at a central opening and provides for the hydraulic drive of the main body 18 and attached fan 26 as described below. Ring 43, preferably formed from TEFLON, is mounted in an annular groove 44 in the outer or front face of the clutch plate 42 and improves pump-out or clutch disengagement as described below.

As illustrated in FIG. 2, the centrifugal forces of the rotating assembly 14 force the axial fluid flow through gate 40 to radial fluid flow indicated at directional arrows 45 into the collecting chamber 41.

Axial flow fluid indicated at directional arrows 46 is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42 to provide for the hydraulic drive of the main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 that extends from driving connection with a center shaft 56 rotatably mounted in a tubular hub portion 58 formed in the central portion of the cover plate 30. An O-ring seal 60 is mounted in an annular groove in the center shaft 56 and makes peripheral contact with the inner wall of the hub portion 58 to prevent fluid leakage to the exterior of the assembly 14.

A helically-wound bimetallic thermostatic valve control element 62 includes an inner end portion 62A mounted in a transverse slot formed in a forward end of the center shaft 56 and an outer end portion 62B mounted in a retaining tab 64 formed in the cover plate 30. Preferably, valve control element 62 is recessed within a cavity 65 surrounding the hub portion 58. Through this construction, an increase or decrease in ambient air temperature causes the winding or unwinding of the valve control element 62, resulting in rotation of the center shaft 56 and the attached valve plate 54. When the valve control element 62 expands due to heat, the center shaft 56 and valve plate 54 rotate in one direction to uncover the gates 40. When the valve control element 62 contracts due to cooling, the center shaft 56 and valve plate 54 rotate the opposite direction and cover the gates 40.

In FIG. 2, fluid indicated by directional arrow 68 is forced radially outwardly by centrifugal forces and exits the shear zone 48 into a pumping chamber 70 formed and bounded by the pump plate 38, the clutch plate 42 and the divider ring 43.

A pair of well-known, projecting wipers 72 are pressed in the pump plate 38 adjacent the periphery thereof. Each wiper 72 is formed as an integral element of the pump plate 38. Although wipers 72 are usually formed as cylindrical projecting elements, other shapes are within the scope of the present invention. In the embodiment illustrated in FIGS. 2-6, each wiper 72 is formed by a conventional stamping process For example, a conventional male punch die (not illustrated) can be forced against a front surface 74, i.e. the surface in communication with the reservoir 52, of the pump plate 38, to form a depression 76 in the front surface 74 having a depth greater than the thickness of the pump plate 38 and a protrusion or button in a rear surface 80, i.e. the surface in communication with the pumping chamber 70, of the pump plate 38. A female die (not illustrated) is positioned adjacent the rear surface 80 and acts as a mold to form the button. It is understood that any suitable means can be used to form the wipers 72.

Each wiper 72 includes a substantially circular, ring-like wall 82 and a central body 84. The male punch die and female die used to form the wipers 72 illustrated in FIGS. 2-6 included complementary flattened or planar portions which produced a planar surface 86 on each wiper 72. The wall 82 connects the body 84 to the pump plate 38 and is formed during the stamping process. The height of the wall 82 must be less than the distance between the pump plate 38 and the clutch plate 42 so that the wipers 72 fit in the pumping chamber 70. As illustrated in FIG. 2, a minimal gap is provided between the body 84 of the wiper 72 and the clutch plate 42 to facilitate assembly tolerances.

A portion of each wiper 72 is removed by any suitable means. The portion removed is an area of the wall 82 adjacent the planar surface 86. The removed portion forms an inlet 88 (FIGS. 5 and 6) for oncoming fluid 90 in a fluid channel 92 indicated by broken lines (FIG. 4 only). The fluid channel 92 is formed in the pumping chamber 70. Fluid 90 is forced toward the wipers 72 as the pump plate 38 is driven in the direction of arrow 94.

In the embodiment of FIGS. 2-6, the removal of a portion of wall 82 was accomplished by a knife edge (not illustrated) provided on the male punch die. As a wiper 72 was pressed into the pump plate 38, the knife edge sheared the wall 82 to form the inlet 88. The stamp and shear procedure was accomplished as a single step. Other methods of forming the inlet, such as cutting, are within the scope of the present invention.

The inlet 88 formed in the wall 82 of the wiper 72 acts as an orifice for fluid 90 to travel from the pumping chamber 70 to the reservoir 52. The inlet 88 is bounded by the remaining portions of the wall 82 and body 84 and the rear surface 80 of the pump plate 38. The area of the inlet 88 is determined by the amount of fluid that must travel from the pumping chamber 70 to the reservoir 52 and the time required for the pump-out.

As fluid 90 encounters the planar surface 86, a pressure rise is created in the pumping chamber 70 which enhances the pump-out of fluid from the pumping chamber 70 to the reservoir 52 through the orifice created by the inlet 88. The orientation of the planar surface 86 with respect to fluid 90 can be varied depending upon the desired pump-out characteristics of a particular clutch assembly.

A second preferred embodiment of the present wiper, indicated generally at 100, is illustrated in FIGS. 7-9. The wiper 100 includes a ring-like wall 102 and body 104 integrally formed in the pump plate 38 and projecting into the pumping chamber 70. The wall and body define a depression 76 having a depth greater than the thickness of the pump plate 38. A portion of the wall 102 and body 104 are removed by any suitable means to form an inlet 106 and arcuate damming or scoop surface 108.

Wiper 100 was formed by a two-stage operation. First, the wiper 100 was stamped as a cylindrical projection in the pump plate 38 by a conventional stamping process utilizing male and female die elements Second, a circular cutting tool was used to remove a portion of the wall 102 and body 104. The amount of material removed from the wiper 100 is determined by the desired pump-out characteristics of a particular clutch assembly. Other methods of removing a portion of the wall 102 and body 104, such as punching, to form an inlet 106 and scoop surface 108 are within the scope of the present invention.

The scoop surface 108 creates a pressure rise in the pumping chamber 70 which enhances the pump-out of fluid 90 from the pumping chamber 70. The scoop surface 108 provides a "bay" or inlet for fluid 90 and produces a desirable and well-known pressure rise in the fluid channel 92. Fluid 90 passes through inlet 106 from the pumping chamber 70, to the reservoir 52. The orientation of scoop surface 108 with respect to fluid 90 can be varied depending upon the desired pump-out characteristics of a particular clutch assembly.

The present wipers 72 and 100 provide an integrally formed wiper and orifice suitable for conventional pump plates. Wipers 72 and 100 are economical to manufacture and provide desirable pump-out characteristics. While two embodiments have been presented, other embodiments are easily envisioned. For example, various profiles and shapes, such as rectangular, can be provided for the wipers. To produce desired pump-out characteristics, various shapes and profiles for inlets and damming surfaces can be provided on the wipers.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for separating a pumping chamber and a reservoir of a viscous fluid clutch, wherein the pumping chamber receives fluid from a shear zone, the pump plate assembly comprising:
   (a) a plate member of a preselected thickness having a front surface in communication with the reservoir and a rear surface in communication with the pumping chamber;
   (b) wiper means integrally formed on the plate member and projecting into the pumping chamber, the wiper means including a ring-like wall terminating in a planar body provided a preselected distance from the rear surface of the plate member, whereby the wall and body define a depression in the plate member having a depth greater than the thickness of the plate member and in fluid communication with the reservoir; and
   (c) inlet means formed on the wiper means to provide an orifice for permitting the passage of fluid from the pumping chamber to the reservoir, the inlet means including
      (i) an aperture provided in the wall oriented in the direction of oncoming fluid in the pumping chamber thereby providing a planar fluid path from the rear surface of the plate member to the depression formed by the wiper means, and
      (ii) a concave arcuate surface in the body and the wall adjacent the aperture for creating a fluid dam in the pumping chamber.

* * * * *